United States Patent [19]
McDonald

[11] Patent Number: 5,272,969
[45] Date of Patent: Dec. 28, 1993

[54] CANNED FOOD PRODUCT COMPRESSING AND LIQUID EXTRACTING DEVICE

[76] Inventor: Brian McDonald, 409 E. Alexander Ave., Merced, Calif. 95340

[21] Appl. No.: 6,803

[22] Filed: Jan. 21, 1993

[51] Int. Cl.$^5$ .................... B30B 9/06; B30B 7/00
[52] U.S. Cl. ........................ 100/110; 99/495; 100/234; 294/16; 294/64.1; D7/666
[58] Field of Search ............... 100/110, 116, 234, 243, 100/293; 99/495; 294/16, 64.1; D7/666

[56] References Cited

U.S. PATENT DOCUMENTS

| | | | |
|---|---|---|---|
| D. 244,118 | 4/1977 | Dick | 100/234 X |
| D. 311,116 | 10/1990 | Pentland | D7/666 |
| D. 330,313 | 10/1992 | Green | D7/666 |
| 805,887 | 11/1905 | Smith | 294/67.1 X |
| 879,870 | 2/1908 | Hansen | 100/243 X |
| 913,889 | 3/1909 | Hershiser . | |
| 1,026,696 | 5/1912 | Nemes | 100/243 X |
| 1,863,531 | 6/1932 | Bungay | 294/64.1 X |
| 2,296,073 | 9/1942 | Walgo | 294/64.1 X |
| 2,529,779 | 11/1950 | McLellan | 294/64.1 |
| 2,541,819 | 2/1951 | Hudson | 294/64.1 X |
| 3,995,544 | 12/1976 | Farley | 100/116 |
| 4,355,574 | 10/1982 | Bond et al. | 100/234 |
| 4,860,647 | 8/1989 | Kerslake | 100/234 |

FOREIGN PATENT DOCUMENTS

| | | | |
|---|---|---|---|
| 624013 | 1/1936 | Fed. Rep. of Germany | 100/243 |
| 854143 | 4/1940 | France | 99/495 |
| 1027836 | 5/1953 | France | 100/234 |

Primary Examiner—Stephen F. Gerrity
Attorney, Agent, or Firm—John R. Flanagan

[57] ABSTRACT

A canned material compressing and liquid extracting device includes a pair of elongated lower and upper handles and a hinge pivotally attaching adjacent respective one ends of the handles together permitting the handles to be moved toward and away from each other between a closed position and an opened position. The device also includes a land portion mounted on the lower handle for seating a container which has an open top end and encloses a material to be compressed and a piston member pivotally mounted to the upper handle for insertion into the open top end of the container so as to overlie a severed lid of the container for applying a force on the severed lid sufficient to compress the material in the container and extract liquid therefrom as the upper and lower handles are moved relative to one another from the opened position toward the closed position. The device further includes a linkage extending between and connected with the piston member and the one end of the lower handle to cause pivoting of piston relative to the upper handle in a direction opposite to the direction of pivoting of the upper handle relative to the lower handle as the handles are moved toward and away from one another so as to maintain the piston in a predetermined alignment with the container for facilitating uniform compressing of the material in the container.

20 Claims, 1 Drawing Sheet

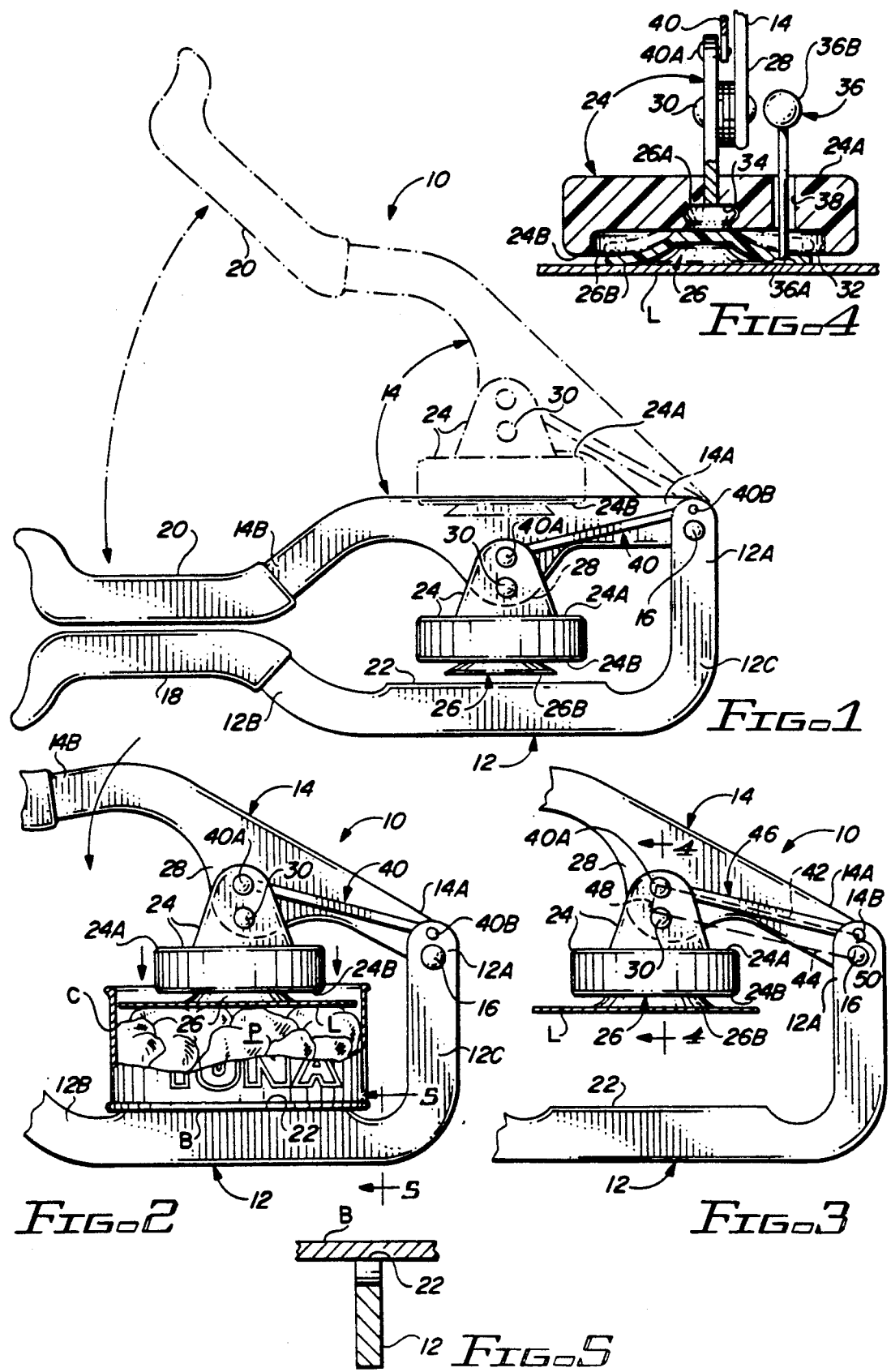

CANNED FOOD PRODUCT COMPRESSING AND LIQUID EXTRACTING DEVICE

BACKGROUND OF THE INVENTION

1. Field of the Invention

The present invention generally relates to a household utensil and, more particularly, is concerned with a canned food product compressing and liquid extracting device.

2. Description of the Prior Art

It is well known that many solid food products, such as meat and fish, are canned with a relatively high content of liquid, such as water or oil. Thus, it is frequently desirable or necessary to separate or extract the liquid from the solid food product in connection with preparation of the food product or to facilitate extraction of the solid food product from the container.

A common procedure for extracting the liquid is to cut the lid from the container and then hold the lid against the canned contents while the container is inverted to allow liquid to drain from the container. The solid food product is retained in the container by the lid while the liquid drains from the container. This procedure can be hazardous due to the presence of sharp edges of the cut lid and the need to handle the lid in order to carry out the procedure.

Various utensils have been proposed in the prior patent art for use in separating liquid from the solid food product in a container. Representative examples of such utensils are disclosed in U.S. Pat. No. 3,995,544 to Farley, U.S. Pat. No. 4,355,574 to Bond et al and U.S. Pat. No. 4,860,647 to Kerslake. However, these utensils have several drawbacks. First, users of these utensils still have to accomplish the removal and disposal of the container lid by hand. Second, operation of the utensils can produce uneven product compression.

Consequently, a need still exists for an improved device for effectuating separation or extraction of liquid from the solid food product in the container without incurring the drawbacks of the prior art devices.

SUMMARY OF THE INVENTION

The present invention provides a canned food product compressing and liquid extracting device designed to satisfy the aforementioned need. The compressing and extracting device enables an operator to compress the solid contents of the canned food product container and remove unwanted liquids, while simultaneously assisting with the removal of the container lid.

Accordingly, the present invention is directed to a canned food product compressing and liquid extracting device which comprises: (a) a pair of elongated upper and lower handles; (b) means for pivotally attaching adjacent respective one ends of the handles together to permit the handles to be moved toward and away from each other between a closed position and an opened position; (c) first means mounted on the lower handle for seating a container which has an open top end and encloses a material to be compressed; (d) second means pivotally mounted to the upper handle for insertion into the open top end of the container so as to overlie a severed lid of the container for applying a force on the severed lid sufficient to compress the material in the container and extract liquid therefrom as the upper and lower handles are moved relative to one another from the opened position toward the closed position; and (e) third means extending between and connected with the second means and the one end of the lower handle for causing pivoting of the second means relative to the upper handle in a direction opposite to the direction of pivoting of the upper handle relative to the lower handle as the handles are moved toward and away from one another so as to maintain the second means in a predetermined alignment with the container for facilitating uniform compressing of the material in the container.

More particularly each handle has a hand grip portion extending from another end of the handle opposite from the one end thereof. The hand grip portion has a fishtail shape. Also, the lower handle has an upturned end portion extending in transverse relation to the remainder of the lower handle. The one end of the lower handle is located on the upturned end portion thereof.

Further, the first means for seating the container on the lower handle is a land portion defined on the lower handle between and spaced from the one end of the lower handle and an opposite end thereof. The second means for applying a force on the lid is a piston member pivotally connected to the upper handle. The third means for causing pivoting of the second means relative to the upper handle in a direction opposite to the direction of pivoting of the upper handle relative to the lower handle is a linkage which together with the upper handle define a pair of generally parallel spaced apart first and second legs of a parallelogram-shaped hinge coupling.

Also, the device includes a flexible suction cup mounted to a lower side of the piston member for creating a vacuum condition between the suction cup and the severed lid upon applying of the force by the piston member on the severed lid so as to attach the suction cup to the severed lid so that the severed lid is removed from the container as the upper and lower handles are moved relative to one another from the closed position toward the opened position. Further, the device includes means attached to the suction cup and being actuatable for releasing the vacuum condition between the suction cup and the severed lid. The vacuum releasing means includes an elongated arm attached at one end to a portion of the suction cup and being grippable for pulling and lifting the suction cup portion away from the severed lid to release the vacuum condition. Also, the elongated arm extends through a passageway defined between lower and upper sides of the piston member and therefrom extends above the upper side of the piston member.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a side elevational view of a canned food product compressing and liquid extracting device of the present invention.

FIG. 2 is a fragmentary side elevational view of the compressing and extracting device in conjunction with a container having its lid severed and attached to the device and in an operative position for compressing the food product in the container and extracting liquid therefrom.

FIG. 3 is a view similar to that of FIG. 2 without the container.

FIG. 4 is an enlarged fragmentary sectional view taken along line 4—4 of FIG. 3.

FIG. 5 is an enlarged fragmentary sectional view taken along line 5—5 of FIG. 2.

DETAILED DESCRIPTION OF THE INVENTION

Referring to the drawings and particularly to FIG. 1, there is illustrated a canned food product compressing and liquid extracting device, generally designated 10, of the present invention. The device 10 enables an operator to compress the contents P of a canned food product container C and remove unwanted liquids, while simultaneously assisting with the removal of the container lid L. All containers C must be opened by severing the container end panel or lid L precedent to operation of the device 10. The device 10 is designed to operate with various sizes of commercially produced meat and seafood containers which contain a variety of food products commonly packed in liquids, such as tuna, salmon, shrimp, crab, chicken, etc.

Referring to FIGS. 1 to 3, the device 10 basically includes a pair of elongated lower and upper handles 12, 14 and suitable means such as in the form of a hinge pin 16 for pivotally attaching the handles together at adjacent one ends 12A, 14A thereof to permit the handles 12, 14 to be moved toward and away from each other between a closed position, as shown in solid line form in FIG. 1, and an opened position, as shown in dashed line form in FIG. 1 and solid line form in FIGS. 2 and 3. Each of the handles 12, 14 has a fishtail shaped hand grip portion 18, 20 extending from the adjacent opposite ends 12B, 14B thereof. Also, the lower handle 12 has an upturned end portion 12C extending at substantially 90° to the remainder of the lower handle 12 and containing the one end 12A of the lower handle 12.

The lower handle 12 has suitable means 22 for seating the container C containing the food product P to be compressed. The seating means 22 can take the form of a cradle or land portion 22 defined on the lower handle 12 at a location between and spaced from its hand grip portion 18 and upturned end portion 12C. The land portion 22 can have the same width as the lower handle 12 as seen in FIG. 5 or could be a flat plate attached thereon to extend beyond the opposite sides of the lower member 12.

The device 10 also basically includes means in the form of a lid compression piston member 24 and a lid suction cup 26 mounted to the piston member 24. The piston member 24 has a circular configuration and upper and lower opposite sides 24A, 24B. The piston member 24 is pivotally connected at its upper side 24A to the upper handle 14 between the opposite ends 14A, 14B thereof so as to face at its lower side 24B toward and substantially centered with the land portion 22 on the lower handle 12. Also, the piston member 24 is preferably fabricated of an inelastic material suitable for applying a force in a downward direction on the severed lid L so as to drive the severed lid toward a bottom B of the container C as the upper and lower handles 12, 14 are moved relative to one another from the opened position toward the closed position.

More particularly, in the exemplary form shown in FIGS. 1 to 3, the upper handle 14 has a lug portion 28 thereon being located between and spaced from its hand grip portion 20 and its one end 14A which is pivotally hinged to the corresponding one end 12A of the lower handle 12. The lug portion 28 projects toward and is centered with the land portion 22 on the lower handle 12. The piston member 24 is pivotally mounted by a pin connector 30 to the lug portion 28 of the upper handle 14 for inserting the piston 24 through the top open end of the container C into an overlying relation with the severed lid L of the container C.

The flexible suction cup 26 has an upper annular mounting portion 26A and a lower flared conical hollow portion 26B. Preferably, the piston member 24 and the suction cup 26 are substantially circular in configuration with the piston member 24 having a larger diameter than the suction cup 26. Given the larger size of the piston member 24 compared to the suction cup 26, the periperal portion of the piston member 24 at the lower side thereof thus surrounds and extends laterally outwardly beyond a periperal portion of the lower flared conical portion 26B of the suction cup 26 for making direct engagement with the severed lid L. Also, the piston member 24 has an outer circular recessed depression 32 formed in the lower side 24B thereof and an inner recessed circular cavity 34 formed centrally in the outer depression 32. The suction cup 26 is mounted at the lower side 24B of the piston member 24 by the upper annular mounting portion 26A of the suction cup 26 being secured within the inner circular cavity 34 in the piston member 24. The lower conical portion 26B of the suction cup 26 is deformable for creating a vacuum condition between the suction cup 26 and the severed lid L upon application of the force by the piston member 24 on the severed lid L and on the suction cup 26. The creation of the vacuum condition causes attachment of the suction cup 26 to the severed lid L such that the severed lid L is removed from the container C by the suction cup 26 as the lower and upper handles 12, 14 are moved relative to one another from the closed position toward the opened position. In creating the vacuum condition, the suction cup 26 is deformed from a contracted position in which the lower conical portion 26B of the suction cup 26 extends from the outer recessed depression 32 in the piston member 24, as shown in solid line form in FIG. 4, to an expanded position in which the lower conical portion 26B of the suction cup 26 becomes substantially flattened and is received within the outer recessed depression 32 in the piston member 24, as shown in dashed line form in FIG. 4.

Thus, once the food product has been compressed, the severed lid L is extracted from the container C with the suction cup 26 as the handles 12, 14 are reopened. After the severed lid L is extracted from the container C, it is desirable to be able to detach it from the suction cup 26 without having to take hold and pull on the severed lid L. The device 10 includes means 36 which an operator may use to release the vacuum condition between the severed lid L and the suction cup 26 without having to pull on the lid. This provides an improved, safer, hands off method of lid retrieval and disposal.

In an exemplary embodiment shown in FIG. 4, the vacuum releasing means 36 takes the form of an elongated arm 36 attached at one end 36A to a portion of the suction cup 26. The arm 36 is actuatable by gripping its outer end 36B and then pulling on the arm 36 to lift the portion of the suction cup 26 away from the lid L and release the vacuum condition between the suction cup 26 and the severed lid. The elongated arm 36 preferably extends through a passageway 38 defined between the lower and upper sides 24B, 24A of the piston member 24 and therefrom extends from the upper side 24A of the piston member 24.

The device 10 also includes means preferably in the form of a mechanical linkage 40 extending between and connected with the piston member 24 and the one end 12A of the lower handle 12 for causing pivoting of the piston member 24 relative to the upper handle 14 in a direction counter or opposite to the direction of pivoting of the upper handle 14 relative to the lower handle 12 as the handles 12, 14 are moved toward and away from one another. The linkage 40 maintains the piston member 24 in a predetermined alignment and orientation, preferably a parallel relationship, with the container C and land portion 22 of the lower member 12 for facilitating uniform compressing of the product P in the container C between the lower side 24B of the piston member 24 and the bottom B of the container C. The mechanical linkage 40 together with the upper handle 14 define a pair of generally parallel spaced apart first and second legs 42, 44 of fixed length of a parallelogram-shaped hinge coupling 46, depicted by the dashed box in FIG. 3. The linkage 40 has a pair of opposite ends 40A, 40B defining a pair of first pivotal connections respectively with the one end 12A of the lower handle 12 and with the piston member 24 such that the first leg 42 of the parallelogram hinge coupling 46 is the portion of the linkage 40 extending between the first pivotal connections. The upper handle 14 has a pair of spaced portions defining a pair of second pivotal connections respectively at the hinge pin 16 and pin connector 30 and respectively with the one end 12A of the lower handle 12 and with the piston member 24 such that the second leg 44 of the parallelogram hinge coupling 46 is the portion of the upper handle 14 extending between the second pivotal connections. As depicted also in FIG. 3, third and fourth legs 48, 50 of fixed length of the parallelogram hinge coupling 46 extend between the adjacent ends of the first and second legs 42, 44.

Advantageously, the compression force applied to move the handles 12, 14 to the closed position can be applied with but a single hand gripping the handles 12, 14 of the device 10. This force is employed by the piston member 24 to drive the severed container lid L toward the bottom B of the container C. The container C is supported by the lower handle 12 and a free hand of the operator, thus resulting in an improved ability to extract unwanted liquids from both the product P and container C. The handles 12, 14 may be composed of a suitable metal or plastic material, and may be formed into a unique fishtail shape, as seen in FIG. 1. The handles 12, 14 can be made to conform to both food product containers and operator's hands, to improve structural strength by avoiding acute angles, and to enhance the overall appearance of the device 10. The handles 12, 14 can have a flat single wall construction or a flat, parallel spaced apart and reinforced double-walled construction. In either case, the shape of the device 10 accommodates insertion of an operator's thumb and fingers simultaneously with the insertion of the container. This allows an operator to release and regain his or her grip around the container C without interference from the device 10, and improves manual dexterity throughout the process. The shape of the device 10 also allows an operator to pick it up and set it down using a single hand, while the device 10 is holding a container C. This improves the versatility of the device 10.

In summary, the above-described compressing and extracting device 10 of the present invention has the following advantages: (1) improves the ability to extract liquids from canned food products; (2) makes liquid extraction and food product compression quicker and easier; (3) eliminates liquids from contacting the user's hands; (4) eliminates the handling of container lids thereby improving safety; (5) allows the extraction of liquids and the removal of container lids for persons previously unable to do so, such as children, elderly persons, and disabled persons; and (6) operates in conjunction with a variety of container sizes.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A canned material compressing and liquid extracting device, comprising:
    (a) a pair of elongated upper and lower handles;
    (b) means for pivotally attaching adjacent respective one ends of said handles together to permit said handles to be moved relative to one another toward and away from each other between a closed position and an opened position;
    (c) first means mounted on said lower handle for seating a container which has an open top end and encloses a material to be compressed;
    (d) second means pivotally mounted to said upper handle for insertion into the open top end of the container so as to overlie a severed lid of the container for applying a force on the severed lid sufficient to compress the material in the container and extract liquid therefrom as said upper and lower handles are moved relative to one another from said opened position toward said closed position; and
    (e) third means extending between and connected with said second means and said one end of said lower handle for causing pivoting of said second means relative to said upper handle in a direction opposite to the direction of pivoting of said upper handle relative to said lower handle as said handles are moved toward and away from one another so as to maintain said second means in a predetermined alignment with the container for facilitating uniform compressing of the material in the container.

2. The device of claim 1 wherein each of said handles has a hand grip portion extending from another end of said handle opposite from said one end thereof.

3. The device of claim 2 wherein each of said hand grip portions has a fishtail shape.

4. The device of claim 1 wherein said lower handle has an upturned end portion extending in transverse relation to the remainder of said lower handle.

5. The device of claim 4 wherein said one end of said lower handle is located on said upturned end portion thereof.

6. The device of claim 1 wherein said first means for seating the container on said lower handle is a land portion defined on said lower handle between and spaced from said one end of said lower handle and an opposite end thereof.

7. The device of claim 1 wherein said second means for applying the force on the lid is a piston member pivotally connected to said upper handle between opposite ends thereof, said piston member facing toward and substantially centered with said first means on said lower handle for applying said force on and driving the severed lid toward a bottom of the container as said upper and lower handles are moved relative to one another from said opened position toward said closed position.

8. The device of claim 1 wherein said third means for causing pivoting of said second means relative to said upper handle in a direction opposite to the direction of pivoting of said upper handle relative to said lower handle is a linkage which together with said upper handle define a pair of generally parallel spaced apart first and second legs of a parallelogram-shaped hinge coupling.

9. The device of claim 8 wherein said linkage has a pair of opposite ends defining a pair of first pivotal connections respectively with said one end of said lower handle and said second means such that said first leg of said parallelogram hinge coupling is the portion of said linkage extending between said first pivotal connections.

10. The device of claim 9 wherein said upper handle has a pair of spaced portions defining a pair of second pivotal connections respectively with said one end of said lower handle and said second means such that said second leg of said parallelogram hinge coupling is the portion of said upper handle extending between said second pivotal connections.

11. A canned material compressing and liquid extracting device, comprising:
    (a) a pair of elongated upper and lower handles;
    (b) means for pivotally attaching adjacent respective one ends of said handles together to permit said handles to be moved toward and away from each other between a closed position and an opened position;
    (c) first means mounted on said lower handle for seating a container which has an open top end and encloses a material to be compressed;
    (d) a piston member having upper and lower sides and being pivotally mounted at said upper side to said upper handle for insertion into the open top end of the container so as to overlie a severed lid of the container at said lower side of said piston for applying a force on the severed lid sufficient to compress the material in the container and extract liquid therefrom as said upper and lower handles are moved relative to one another from said opened position toward said closed position; and
    (e) a flexible suction cup mounted to said lower side of said piston member and being deformable for creating a vacuum condition between said suction cup and the severed lid upon applying of the force by said piston member on the severed lid and on said suction cup so as to attach said suction cup to the severed lid so that the severed lid is removed from the container as said upper and lower handles are moved relative to one another from said closed position toward said opened position.

12. The device of claim 11 wherein said piston member is larger in size than said suction cup such that said piston member has a periperal portion at said lower side thereof which surrounds and extends laterally beyond a periperal portion of said suction cup.

13. The device of claim 11 wherein:
    said piston member has a recessed depression formed in said lower side thereof; and
    said suction cup being deformable in response to the application of the force thereon by said piston member from a contracted position in which said suction cup extends from said recessed depression in said piston member to an expanded in which said suction cup is substantially received within said recessed depression in said piston member.

14. The device of claim 11 wherein said piston member and said suction cup are substantially circular in configuration with said piston member having a larger diameter than said suction cup.

15. The device of claim 11 further comprising:
    means attached to said suction cup and being actuatable for releasing said vacuum condition between said suction cup and the severed lid.

16. The device of claim 15 wherein said vacuum releasing means includes an elongated arm attached at one end to a portion of said suction cup and being grippable for pulling and lifting said suction cup portion away from the severed lid to release said vacuum condition.

17. The device of claim 16 wherein said elongated arm extends through a passageway defined between said lower and upper sides of said piston member and therefrom extends from said upper side of said piston member.

18. A canned material compressing and liquid extracting device, comprising:
    (a) a pair of elongated upper and lower handles;
    (b) a hinge for pivotally attaching adjacent respective one ends of said handles together to permit said handles to be moved toward and away from each other between a closed position and an opened position;
    (c) means mounted on said lower handle for seating a container which has an open top end and encloses a material to be compressed;
    (d) a piston member having upper and lower sides and being pivotally mounted at said upper side to said upper handle for insertion into the open top end of the container so as to overlie a severed lid of the container at said lower side of said piston for applying a force on the severed lid sufficient to compress the material in the container and extract liquid therefrom as said upper and lower handles are moved relative to one another from said opened position toward said closed position;
    (e) a flexible suction cup mounted to said lower side of said piston member and being deformable for creating a vacuum condition between said suction cup and the severed lid upon applying of the force by said piston member on the severed lid and on said suction cup so as to attach said suction cup to the severed lid so that the severed lid is removed from the container as said upper and lower handles are moved relative to one another from said closed position toward said opened position; and
    (f) a linkage extending between and connected with said piston member and said one end of said lower handle for causing pivoting of said piston member relative to said upper handle in a direction opposite to the direction of pivoting of said upper handle relative to said lower handle as said handles are moved toward and away from one another so as to maintain said piston member in a predetermined alignment with the container for facilitating uniform compressing of the material in the container.

19. The device of claim 18 wherein:

said linkage together with said upper handle defines a pair of generally parallel spaced apart first and second legs of a parallelogram-shaped hinge coupling;

said linkage has a pair of opposite ends defining a pair of first pivotal connections respectively with said one end of said lower handle and said second means such that said first leg of said parallelogram hinge coupling is the portion of said linkage extending between said first pivotal connections;

said upper handle has a pair of spaced portions defining a pair of second pivotal connections respectively with said one end of said lower handle and said second means such that said second leg of said parallelogram hinge coupling is the portion of said upper handle extending between said second pivotal connections.

20. The device of claim 18 further comprising:

means attached to said suction cup and being actuatable for releasing said vacuum condition between said suction cup and the severed lid.

* * * * *